United States Patent [19]

Fung et al.

[11] Patent Number: 4,491,636

[45] Date of Patent: * Jan. 1, 1985

[54] PROCESS USING HALOGEN/OXYGEN FOR REACTIVATING IRIDIUM AND SELENIUM CONTAINING CATALYSTS

[75] Inventors: Shun C. Fung, Bridgewater, N.J.; Richard W. Rice, Clemson, S.C.

[73] Assignee: Exxon Research & Engineering Co., Florham Park, N.J.

[ * ] Notice: The portion of the term of this patent subsequent to May 8, 2001 has been disclaimed.

[21] Appl. No.: 547,946

[22] Filed: Nov. 2, 1983

Related U.S. Application Data

[63] Continuation-in-part of Ser. No. 374,975, May 5, 1982, Pat. No. 4,447,551.

[30] Foreign Application Priority Data

May 4, 1983 [JP] Japan ................... 58-78847

[51] Int. Cl.$^3$ .............. B01J 27/30; B01J 23/96; B01J 27/02; C10G 35/085
[52] U.S. Cl. .................................. 502/37; 208/140
[58] Field of Search .................. 502/35, 36, 37, 38, 502/52; 208/140

[56] References Cited

U.S. PATENT DOCUMENTS

| | | | |
|---|---|---|---|
| 3,622,520 | 11/1971 | Hayes ................... | 252/415 |
| 3,625,860 | 12/1971 | Condrasky ............. | 252/415 |
| 3,904,510 | 9/1975 | Sinfelt et al. ........... | 208/140 |
| 3,937,600 | 2/1976 | Yates et al. ............ | 208/140 |
| 3,939,061 | 2/1976 | Paynter et al. ........ | 208/140 |
| 3,939,062 | 2/1976 | Sinfelt et al. ........... | 208/140 |
| 3,941,682 | 3/1976 | Kmak et al. ........... | 208/140 |
| 3,941,716 | 3/1976 | Paynter ................. | 252/415 |
| 3,943,052 | 3/1976 | Kmak et al. ........... | 208/140 |
| 3,981,823 | 9/1976 | Yates .................... | 252/415 |
| 4,046,673 | 9/1977 | Paynter et al. ........ | 208/140 |
| 4,159,938 | 7/1979 | Lewis .................... | 208/139 |
| 4,166,046 | 8/1979 | Eberly, Jr. ............. | 502/215 |
| 4,169,043 | 9/1979 | Eberly, Jr. ............. | 502/215 |
| 4,172,817 | 10/1979 | Yates et al. ............ | 208/140 |
| 4,265,786 | 5/1981 | Eberly, Jr. et al. ..... | 502/215 |
| 4,359,400 | 11/1982 | Landolt et al. ........ | 252/415 |

FOREIGN PATENT DOCUMENTS

| | | |
|---|---|---|
| 0057551 | 11/1982 | European Pat. Off. . |
| 2257337 | 8/1975 | France . |
| 2290953 | 11/1975 | France . |
| 1484372 | 9/1977 | United Kingdom . |
| 1516518 | 7/1978 | United Kingdom . |

*Primary Examiner*—P. E. Konopka
*Attorney, Agent, or Firm*—Robert J. North; Edward H. Mazer

[57] ABSTRACT

A process is disclosed for reactivating an agglomerated iridium and selenium containing catalyst and particularly platinum-iridium-selenium on alumina reforming catalysts. The process includes a reducing step involving contacting a decoked agglomerated catalyst with a reducing gas such as hydrogen to reduce agglomerated iridium oxides to the free metal, a hydrogen halide pretreatment step to provide a halide level to the catalyst of about 1.3 weight percent, and an elemental halogen/oxygen or wet oxygen redispersion step. The hydrogen halide pretreatment step is performed under elemental oxygen-free conditions prior to redispersion and allows high iridium redispersion values to be obtained. If no iridium oxides are initially present, the hydrogen step is optional.

21 Claims, No Drawings

PROCESS USING HALOGEN/OXYGEN FOR REACTIVATING IRIDIUM AND SELENIUM CONTAINING CATALYSTS

CROSS REFERENCE TO RELATED APPLICATIONS

This application is a continuation-in-part application of copending Ser. No. 374,975, filed May 5, 1982, now U.S. Pat. No. 4,447,551.

BACKGROUND OF THE INVENTION

This invention relates to a process for reactivating an agglomerated iridium-containing catalyst, also containing selenium involving the sequential steps of reducing agglomerated iridium oxides if present on the catalyst surface to the free metal, pretreating the catalyst surface with a halide-providing compound, preferably hydrogen chloride in the absence of elemental oxygen, and redispersing the iridium metal by contacting with elemental halogen and oxygen.

SUMMARY OF THE INVENTION

Small amounts of selenium, as the metal, salt, or compound thereof, are known to significantly improve higher octane $C_5+$ liquid product yields of an iridium-containing catalyst during reforming operations as described in U.S. Pat. No. 4,166,046, hereby incorporated by reference. Selenium can thus be used in place of a conventional presulfiding step to reduce the hydrocracking activity of the reforming catalyst. However, whether or not the catalyst is presulfided, or contains selenium, during the reforming operation, a progressive decline in catalyst activity occurs due in part to the formation of carbonaceous residues on the catalyst surface. Conventional regeneration and redispersion methods applicable to platinum containing reforming catalysts for removing the carbonaceous deposits and restoring catalyst activity are not satisfactory when applied to iridium containing catalysts and result in incomplete restoration of catalyst activity.

It has been found that iridium-containing catalysts containing agglomerated metallic iridium and/or iridium oxides and a selenium hydrocracking agent can be efficiently redispersed and reactivated by the use of a halide pretreatment prior to a halogen redispersion step, both steps following decoking and reduction of the iridium oxides, if present.

The halide pretreatment step is conducted with two limitations, (1) that about 1.3 weight percent halide and, preferably 1.4 to 2.5 weight percent halide, taken as the coke-free, dry catalyst, and most preferably saturated with halide under the conditions used, is present on the catalyst surface after the pretreatment and maintained at or above this level up to and during the subsequent halogen/oxygen or wet oxygen redispersion step, and (2) that during the halide pretreatment step, no elemental oxygen is present in the feedstream or is generated in situ. If this halide level is not maintained during subsequent redispersion and if elemental oxygen is present during the pretreatment, then substantially lower redispersion values will be obtained with concomitant decrease in catalyst metal surface area and activity.

The subject process is applicable to a wide variety of iridium and selenium containing catalysts and particularly to reforming catalysts employing platinum-iridium and selenium on alumina, which are completely or partially decoked.

Generally, halide-producing compounds are used in the pretreatment step including organic halides and hydrogen halides with gaseous hydrogen chloride being the preferred hydrogen halide-generating compound used in the pretreatment and chloride levels of about 1.3 weight percent of catalyst and above, on the catalyst surface are necessary to insure effective redispersion. The halide weight percent is expressed on the basis of dry, coke-free catalyst.

The pretreatment step is generally conducted in the temperature range of about 250° to 600° C., and the halide weight percentage can be monitored, for example, by X-ray fluorescence versus known standards. Generally, with the exception of very severely coked and agglomerated iridium-containing catalyst, the subject process is capable of producing substantially decoked, highly redispersed, iridium-containing catalyst in a one-cycle treatment.

In accordance with this invention, there is provided a process for reactivating an agglomerated catalyst containing metallic iridium and selenium comprising the steps of: (a) pretreating the iridium and selenium containing catalyst by contact with a substantially elemental oxygen-free atmosphere comprising a halide-providing compound at an elevated temperature to provide about 1.3 weight percent and above, halide to the catalyst, based on the coke-free, dry catalyst; and (b) redispersing the metallic iridium from step while maintaining said 1.3 weight percent and above halide provided to the catalyst by contact at an elevated temperature with an atmosphere comprising elemental halogen and a redispersing aid selected from elemental oxygen, or elemental oxygen and water, wherein said halogen and oxygen are present in a halogen to oxygen volume ratio in the range of about 0.05 to 10, for a time sufficient to substantially redisperse said metallic iridium.

A further embodiment of the process is where the agglomerated catalyst further initially contains iridium oxide which is contacted with a reducing atmosphere at elevated temperature to substantially convert said iridium oxide to metallic iridium prior to or concurrently with step (a).

DESCRIPTION OF THE INVENTION AND PREFERRED EMBODIMENTS

The novel process of the present invention includes a halide pretreatment step, prior to a halogen/oxygen or wet oxygen redispersion step, which enhances the potential of the process for mono-cycle reactivation/redispersion and eliminates the need as practiced in the prior art, for rigorous, extended multi-cycle hydrogen/halogen treatment to achieve high redispersion values.

It has been observed that treating a catalyst, which is low in halide content with halogen in a redispersion step without the halide pretreatment, results in the generation of water and oxygen. The generated oxygen moves through the catalyst bed ahead of the halogen "wave". Minimal or only partial redispersion is obtained.

However, halide pretreatment prior to halogen/oxygen redispersion, results in an increase in catalyst halide without the generation of oxygen even though water is being produced. A subsequent halogen/oxygen treatment of the catalyst results in excellent redispersion.

Furthermore, exposing the halide pretreated catalyst to oxygen during the halogen redispersion step also leads to excellent redispersion.

It appears that successful redispersion in the process can be achieved by the elimination of oxygen exposure of the reduced catalyst when the catalyst halide level is low. Thus, processes which provide the means of upgrading the catalyst halide level, without the release of oxygen before the halogen redispersion step or bring about the elimination of oxygen during the halogen/oxygen redispersion step, will result in successful redispersion.

Catalysts which can be treated by the subject process include generally, iridium and selenium containing catalysts, with and without co-catalysts, preferably being supported. Other metallic co-catalysts, which can be present with iridium, which are applicable in the process include metals such, for example, as platinum, rhodium, rhenium, palladium mixtures thereof and the like. The metals can be present in bimetallic, trimetallic combinations and higher combinations, as alloys or physical mixtures on the same support particles or where the metals are individually present on separate support particles. Preferred metal combinations in the catalyst for treatment by the subject process are platinum-iridium, and platinum-iridium-rhenium.

A general description of the catalysts useful in the present process is adequately presented in U.S. Pat. No. 4,166,046 to Paul E. Eberly, Jr., (assigned to Exxon Research & Engineering Co.) together with preparative procedures for the catalyst and properties thereof and is hereby incorporated by reference for this purpose.

The amount of selenium present in the catalyst present or the free metal, salt, or compound thereof, ranges from about 0.001 to 3 percent, based on the weight of the total catalyst, and preferably about 0.01 to 1 weight percent.

The selenium is preferably incorporated into the catalyst by the surface impregnation procedure described in the above-identified patent and the compounds suitable for the addition of selenium to the catalyst composite are selenium monochloride, selenium disulfide, selenium sulfuroxy tetrachloride, selenous acid, selenic acid, selenium tetrachloride, and the like.

The presence of selenium does not generally adversely affect the efficiency of the iridium redispersion and generally the reforming activity of the regenerated and redispersed catalyst is substantially the same as freshly prepared catalyst containing the same level of selenium, and generally no significant loss of selenium from the catalyst is observed.

The metals can be supported on a suitable support, which is conventional, with the proviso that the support is stable during the pretreatment process and does not undergo any deleterious reactions. Representative examples include silica, zeolites, clays, alumina, silica-alumina, zirconia, alumina-zirconia, mixtures thereof, and the like. In general, the active metallic components, if supported, are present in an amount of preferably up to about 10 weight percent of the supported catalyst.

A preferred catalyst which can be reactivated in the process is agglomerated platinum-iridium, containing selenium, preferably supported on alumina.

By the term, "agglomerated catalysts", as used herein, is meant a supported or unsupported catalyst containing metallic iridium singly, or in combination with other metals described herein, in the agglomerated state, sufficient to reduce the catalytic activity of the metal catalyst. The agglomerated metal, e.g., metallic iridium, can be present due to the result of oxygen burn-off of coke deposits producing agglomerated iridium oxide which then must be reduced to metallic iridium by hydrogen gas. Also, hydrogen stripping at high temperature, preferably about 450° to 600° C., will result in partial removal of coke deposits and leave the agglomerated iridium in a metallic state. The metallic iridium in the agglomerated catalyst will undergo effective redispersion by the process described herein. Where the catalyst additionally contains iridium oxide, a hydrogen reducing step is necessary to convert the iridium oxide to metallic iridium prior to redispersion.

The agglomerated metallic iridium-containing catalysts operable in the process can be completely or partially decoked as described above by separate oxygen or hydrogen treat steps or not decoked at all, but simply removed from an on-stream process, e.g., reforming in the presence of hydrogen gas at elevated temperature and subjected to the described process herein.

Agglomerated, coked catalysts are usually industrially decoked by an oxygen burn-off of carbon deposits. Generally, a typical used catalyst from industrial operation may contain up to about 6 weight % of carbon deposits and may be agglomerated after the decoking step up to about a 100% extent as evidenced by X-ray diffraction. Generally, depending on the conditions used in the coke burn, carbon deposits remaining may be present in about 0.05 to 1.0 weight percent of the catalyst, taken as the dry catalyst. In general, the agglomerates may be greater than about 50 Å and up to about 100 Å and greater in crystallite size. Decoking of the catalyst may be conducted under a variety of conditions, but is generally conducted by heating in an atmosphere containing 0.01 to 10 volume % $O_2$ at a temperature of about 400° to 550° C., to remove surface and embedded carbon deposits, and particularly "active" carbon deposits which can react with halogen during the redispersion step to form halogenated species which are not readily removed from the catalyst surface. Generally, about 60–100 weight percent of carbon deposits can be removed in the decoking step. For example, U.S. Pat. No. 3,904,510 describes a typical procedure employed in decoking. The subject process is applicable to a wide range of decoked agglomerated catalysts containing varying amounts of remaining carbon deposits, different degrees of agglomeration, varying particle size ranges and varying impurities.

An optional first step in the subject process is wherein said partially or completely decoked agglomerated catalyst is treated with a reducing atmosphere, generally comprising hydrogen gas to reduce primarily metal oxides and oxide layers which may be present on agglomerated metallic iridium particles, formed during decoking, and as a further aid in removing residual active carbon deposits from the decoking step. If no metallic oxides are present, then the reduction step, as described herein, is not mandatory. However, if metallic oxides are present, the reduction step must be conducted in order to achieve high values of redispersion. Other reducing or inert gases may also be present including nitrogen, helium and the like. The reducing step is generally conducted by contacting the catalyst at an elevated temperature generally in the range of about 250° C. to 600° C., preferably about 300° C. to 540° C. in a reducing atmosphere comprising above about one volume % hydrogen gas or above, for a time to substantially reduce metal oxides present to the free metal as evidenced by the absence of metal oxide lines and the appearance of iridium metal lines in the X-ray diffraction pattern. Larger and smaller volume percentages of hydrogen can also be effectively used.

X-ray diffraction patterns taken on fresh iridium-containing catalysts show no lines corresponding to any metal component, which indicates that the metal components are present in very small particle sizes, less than about 50 Å. X-ray diffraction patterns as taken on the same catalysts used in reforming, from which coke has been burned in numerous cycles of use, generally show distinct metal lines which indicate highly agglomerated metal particles, of about 10 to 100 weight percent agglomeration of crystallites of about 100 Å and greater. Thus, X-ray diffraction is a useful and convenient technique for measuring the extent of agglomeration, reduction and redispersion of the catalyst in the subject process.

Preferred conditions in the reducing step are the use of hydrogen as the reducing gas in a reducing atmosphere comprising essentially hydrogen, at a volume concentration of 0.05 to 5 volume percent and a pressure of about 0.1 to 2.0 MPa, and an inert gas carrier such as nitrogen or helium, particularly preferred at a temperature of about 300° to 540° C. for a time sufficient to achieve a substantial reduction of the iridium oxide and other metal oxide to the free metals. By the term "substantially reduce" is meant a reduction in the numerical amount of iridium oxides present by about 75–100% and preferably about 90–100%. Generally, time requirements for the reduction will be in the range from about one to several hours depending on the process conditions. Shorter and longer times are also applicable.

Following the reduction step, if performed, the partially or completely decoked-reduced catalyst is then subjected to halide pretreatment with a halide-providing compound. By the term "halide-providing compound" is meant a compound containing ionically or covalently bound halogen which, under the process conditions, can release the halogen in halide form, preferably as hydrogen chloride, to the catalyst surface. Representative examples include haloorgano compounds and preferably hydrogen halides. Haloorgano compounds include chlorocarbons such as carbon tetrachloride, methylene chloride, chloroform, methyl chloride, 1,2-dichloroethane, hexachloroethane, mixtures thereof, and the like. When using haloorgano compounds, hydrogen, in a large excess over the stoichiometric amount, must also be used to convert the haloorgano compound to a hydrogen halide.

The hydrogen halides can be hydrogen fluoride, hydrogen chloride, hydrogen bromide or hydrogen iodide. Preferably hydrogen chloride is the halide-generating compound used in the process. The atmospherecontacting the catalyst in this step can contain other inert gases, e.g., nitrogen and the like, and also including water vapor for more uniform distribution of halide on the catalyst surface prior to the halogenation treatment, and also preferably hydrogen gas or reducing gas in an amount of about 1-2 volume percent, to insure that the reduced catalyst remains in the reduced state during hydrogen halide pretreatment. It is essential that the atmosphere be substantially elemental oxygen-free during the halide pretreatment.

In an alternate embodiment, the hydrogen reduction step can be conducted concurrently with the hydrogen halide pretreat step using the combined conditions of each step as described herein. It is essential that the atmosphere be substantially elemental oxygen-free during the halide pretreatment. Within this context, the halide feedstream should also preferably be elemental halogen-free since it is believed that elemental halogen reacts with surface hydroxyl groups to generate elemental oxygen. However, if chlorine is an impurity in the pretreating step gaseous mixture, then a small amount of hydrogen gas should be added to insure the absence of elemental oxygen.

The temperature of the halide pretreatment is generally conducted in the range of about 250° to 600° C. and preferably about 300° to 540° C., and the halide providing compound, at the above-identified temperature, is contacted with the catalyst in a gaseous stream until about 1.3 weight percent halide and above, is provided to the catalyst, as detected, for example, by X-ray fluorescence. Preferably, the catalyst is pretreated to a range of about 1.4 to 2.5 weight percent halide, or higher, and most preferably up to saturation by halide of the catalyst surface under the process conditions, and maintained at a saturated halide level throughout the subsequent redispersion under the process conditions. As described hereinabove, the weight percentage of halide provided to the catalyst is taken as about 1.3 weight percent and above, said catalyst taken on a dry and coke-free basis. Where the catalyst has been extensively used in commercial processes having a lower surface area and catalytic activity as a result of this continued use, a minimum weight percentage of about one percent halide is reasonably believed to be effective in promoting high redispersion values in the subject process. For example, fresh catalysts having BET surface areas of 180 $m^2/g$ and higher will require 1.3 weight percent halide and above. Used catalysts having surface areas of about 100–180 $m^2/g$ will generally require a minimum of 1–1.3 weight percent halide prior to redispersion. However, an exact minimum value can't be stated for a commercial spent catalyst due to large variances in surface area, coke deposits, impurities and poisons present, and the like. One skilled in the art, however, will be able to utilize this disclosure successfully for efficient redispersion. It is important that the halide content be maintained up to the halogen redispersion treatment. If a "purge" of hydrogen, nitrogen, water, mixtures thereof, or other materials is used subsequent to the halide pretreatment, then such purge or contacting step should not reduce the halide level to below about 1.3 weight percent. If this happens, then the halide pretreatment should again be conducted to insure about 1.3 weight percent halide being present. This is particularly true in cases where multicycle treatment may be necessary in which the weight percent of halide present on the catalyst must be replenished again to about 1.3 weight percent or above, prior to each halogen redispersion treatment.

The halide pretreatment is conducted for sufficient time to achieve a halide loading as described above. In practice, a fast flowing stream of preferably hydrogen chloride is contacted with the catalyst up to and slightly beyond breakthrough. By the term "breakthrough" is meant the first visible detection by an analytical method such as, for example, the color change of an acid-base indicator, e.g., phenolphthalein.

Halide pretreatment is conducted to breakthrough to achieve desired halide loading of the catalyst and also to insure a uniform distribution of halide over the entire length of the catalyst bed to prevent "halide gradients" which can lead to non-uniform redispersion. In general, water vapor present in the halide feedstream will tend to lower the halide loading slightly below that compared to a dry halide application, by approximately about 0.4 weight percent, but generally results in a more uniform halide distribution. Thus, saturation by dry HCL of a coke-free, dry catalyst will result in up to about a 2.8 weight percent halide loading, whereas saturation with a wet stream of HCL will result in up to about 2.4 weight percent, or even slightly lower, halide loading.

Time required for the halide pretreatment will, of course, be dependent on many factors including flowrate, hydrogen halide gaseous concentrations, amount of catalyst, and can be desirably adjusted, for example, to run for about 1 to 3 hours per catalyst regeneration in general. Concentration of hydrogen halide can be from 0.05 to about 5 volume percent, or higher, in the feedstream, which can be at a total pressure of about 0.1 to 2 MPa. Higher and lower values of both variables can also be used effectively.

Following the halide pretreatment step, the catalyst is then subjected to a halogen/oxygen or wet oxygen redispersion step by contacting the catalyst with a stream comprising elemental halogen and oxygen gas. Elemental halogen gases applicable are fluorine, chlorine, bromine and iodine with chlorine being a preferred embodiment.

The halogen/oxygen redispersion is generally carried out at a temperature of about 450° to 600° C. and preferably about 500° to 540° C. At this temperature, the gaseous halogen atmosphere, industrially, is generally run at a flow rate over the surface of the catalyst of about 1.1 to 4.4 grams halogen or higher/100 grams catalyst/hour, said catalyst taken on the same basis as described in the hydrogen halide pretreatment, to achieve rapid halogen contact with the catalyst surface.

The gaseous halogen/oxygen atmosphere may also contain inert gases such as nitrogen or helium as carrier gases carbon dioxide from combustion processes, and also water vapor for corrosion inhibition and if present is in an amount of about 0.05 to 2 volume percent.

The gaseous halogen atmosphere contains elemental oxygen as a redispersion aid and is present in an amount of about 0.05 to 25 volume percent. Preferably, elemental oxygen is present in a concentration of about 0.2 to 21 volume percent. Preferred is wherein elemental halogen and elemental oxygen are present in a volume ratio of about 0.05 to 10, respectively, and a particularly preferred range is 0.2 to 5 v/v. The presence of elemental oxygen also serves as an aid in removing small quantities of carbon deposits which may remain after the initial decoking step.

Halogen/oxygen redispersion is generally conducted until breakthrough occurs, as evidenced or detected for example, by a starch-iodine indicator. Generally, this requires about 0.5 to 2 hours of halogen treatment for used catalyst, which depends upon flowrate, halogen concentration in the feedstream, and amount of catalyst. Generally, however, slightly longer times of halogen treatment are required for substantially complete redispersion as evidenced by the absence of crystalline metal or metal oxide lines in the X-ray diffraction patterns. Preferably a time of about 30 to 90 minutes past breakthrough, i.e., substantially past breakthrough, is necessary for substantially complete redispersion assuming a halogen flowrate of about 1.1 grams chlorine/100 grams catalyst/hour and above.

Operation past breakthrough of halogen is preferred to avoid redispersion gradients along the catalyst bed of redispersed iridium metal. Where gradients are present, usually redispersion levels of iridium metal are high at the front part (entrance) of the reactor but decrease towards the tail (exit) of the reactor.

By carrying out the process described herein substantially complete redispersion of iridium and selenium containing catalysts described herein can be achieved, and particularly those of platinum-iridium on alumina used in hydrocarbon reforming operations. In the latter case, 70 to 100 percent redispersion of both the platinum and iridium agglomerated metals can be achieved in the process. The number of cycles necessary should preferably be on. However, in certain cases such as where minimum halogen treatment past breakthrough times are desired, multi-cycle treatment may prove necessary with concomitant need for additional pretreatment steps, as described hereinabove.

By the term "substantially complete redispersion" as used herein, is meant redispersion values, as determined by X-ray diffraction, of greater than about 55 numerical percent and preferably about 75 to 100 numerical percent of the iridium on the catalyst surface, also including other metals where present.

Apparatus useful for carrying out the subject process will be conventional in the art and whether operating on a laboratory scale, pilot plant or full commercial plant scale, the apparatus will be obvious to one skilled in the art.

In practice, following successful redispersion of iridium on the catalyst surface, a reduction of halide to about 1.0 weight percent is carried out prior to the actual reforming process since excess halide, at this stage, leads to cracking of the liquid hydrocarbon fraction to undesirably smaller hydrocarbon fragments. This reduction can be accomplished by a wet hydrogen stream, for example, which also serves to convert all of the metal species present after redispersion to the metallic state prior to use in a reforming process.

What is claimed is:

1. A process for reactivating an agglomerated catalyst containing metallic iridium and selenium comprising the steps of:
   (a) pretreating the iridium and selenium containing catalyst by contact with a substantially elemental oxygen-free atmosphere comprising a halide-providing compound at an elevated temperature to provide about 1.3 weight percent and above halide to the catalyst, taken as the coke-free dry, catalyst; and
   (b) redispersing the metallic iridium from step (a) while maintaining said 1.3 weight percent and above halide provided to the catalyst by contact at an elevated temperature with an atmosphere comprising elemental halogen and a redispersing aid selected from elemental oxygen, or elemental oxygen and water, wherein said halogen and oxygen are present in a halogen to oxygen volume ratio in the range of about 0.05 to 10, for a time sufficient to substantially redisperse said metallic iridium.

2. The process of claim 1 wherein said catalyst is initially present substantially as agglomerated metallic iridium.

3. The process of claim 1 wherein said agglomerated iridium-containing catalyst is present on a catalyst support selected from silica, zeolite, alumina, silica-alumina, zirconia, alumina-zirconia and mixtures thereof.

4. The process of claim 1 wherein said agglomerated catalyst further contains a metal cocatalyst selected from platinum, rhodium, rhenium, palladium and mixtures thereof.

5. The process of claim 1 wherein said halide-providing compound is one which generates a hydrogen halide in the presence of hydrogen gas.

6. The process of claim 5 wherein said halide-providing compound is selected from carbon tetrachloride, chloroform, methylene chloride, methyl chloride, 1,2-dichloroethane, hexachloroethane, and mixtures thereof, in the presence of hydrogen gas.

7. The process of claim 1 wherein said halide-providing compound is hydrogen chloride.

8. The process of claim 1 wherein said halide is present on the catalyst after step (a) in an amount of about 1.4 to 2.5 weight percent, taken as the coke-free, dry, catalyst.

9. The process of claim 1 wherein said catalyst after completion of step (a) is saturated with halide.

10. The process of claim 1 wherein said agglomerated catalyst is platinum-iridium-selenium supported on alumina.

11. The process of claim 1 wherein said catalyst is platinum-iridium-rhenium-selenium supported on alumina.

12. The process of claim 1 wherein the temperature in step (a) is in the range of about 250° to 600° C.

13. The process of claim 1 wherein said elemental halogen in step (b) is chlorine.

14. The process of claim 13 wherein said chlorine and oxygen in step (b) are present in a chlorine to oxygen volume ratio in the range of about 0.05 to 10.

15. The process of claim 1 wherein said temperature in step (b) is in the range of about 450° to 600° C.

16. The process of claim 1 wherein said metallic iridium is 75-100% redispersed.

17. The process of claim 1 wherein said catalyst further contains iridium oxide which is contacted with a reducing atmosphere at elevated temperature to substantially convert said iridium oxide to metallic iridium prior to or concurrently with step (a).

18. The process of claim 17 wherein said reducing atmosphere comprises hydrogen gas.

19. The process of claim 18 wherein the temperature of said contacting with said reducing atmosphere is in the range of about 250°–600° C.

20. A process for reactivating an agglomerated platinum-iridium on alumina catalyst, containing platinum and iridium oxides and selenium comprising the steps of:
(a) contacting said selenium containing agglomerated catalyst with a hydrogen atmosphere at a temperature in the range of about 300° to 540° C., and a pressure of about 0.1–2 MPa, for a sufficient time to substantially reduce said oxides of platinum and iridium to the respective metals;
(b) pretreating said catalyst from step (a) by contact with an elemental oxygen-free atmosphere comprising hydrogen chloride at a temperature in the range of about 300° to 540° C. and a pressure of about 0.1–2 MPa for a time sufficient to saturate the catalyst with chloride; and
(c) redispersing the metallic iridium and platinum while maintaining a saturated chloride level by contact with an atmosphere comprising elemental chlorine, elemental oxygen and water in a $Cl_2/O_2$ volume ratio of about 0.2 to 5 at a temperature in the range of about 500° to 540° C., and a pressure of about 0.1–2 MPa for a time sufficient to effect about a 75-100% redispersion of both metallic platinum and iridium.

21. A process for reactivating an agglomerated metallic platinum-iridium-selenium on alumina catalyst, which has been partially decoked by hydrogen gas, comprising the steps of:
(a) pretreating said selenium containing catalyst by contact with an elemental oxygen-free atmosphere comprising hydrogen chloride at a temperature in the range of about 300° to 540° C. and a pressure of about 0.1–2 MPa for a time sufficient to saturate the catalyst with chloride; and
(b) redispersing the metallic iridium and platinum while maintaining a saturated catalyst chloride level by contact with an atmosphere comprising elemental chlorine, elemental oxygen and water, in a chlorine to oxygen volume ratio of about 0.2 to 5, at a temperature in the range of about 500° to 540° C., and a pressure of about 0.1–2 MPa for a time sufficient to effect about a 75-100% redispersion of both metallic platinum and iridium.

* * * * *